Feb. 8, 1927.
F. E. WILSON
SEPTIC TANK
1,616,837
Original Filed Dec. 3, 1923    2 Sheets-Sheet 1
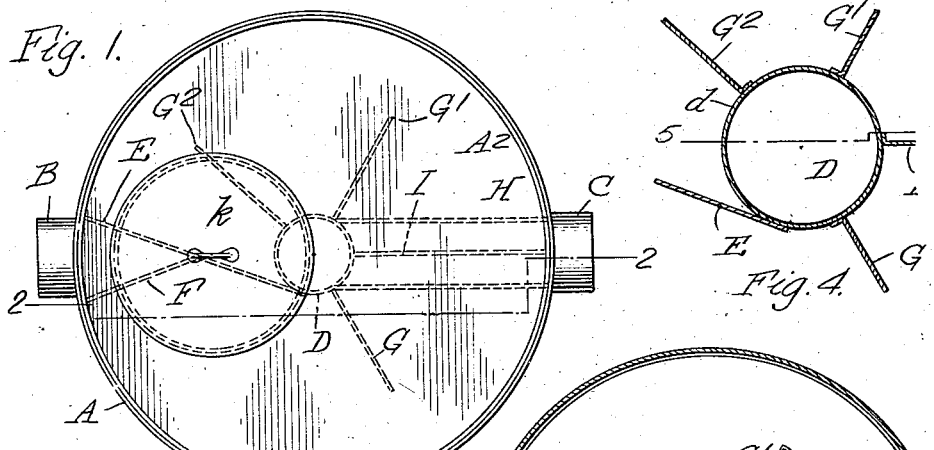
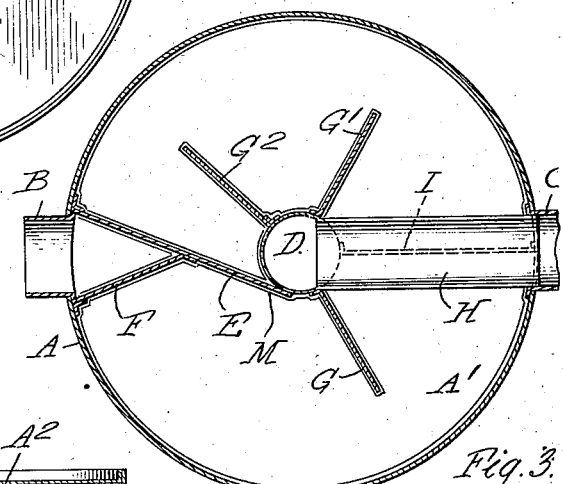
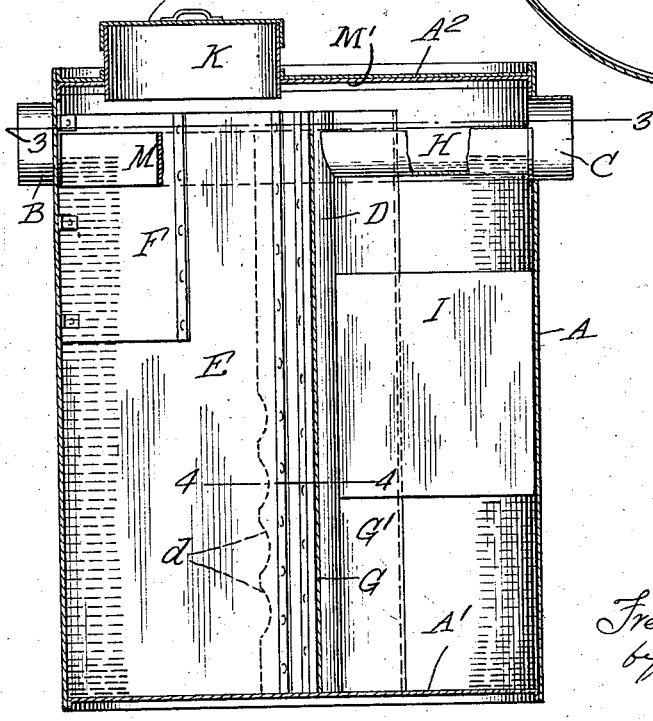
INVENTOR
Frederick E. Wilson
by Parker & Brochius,
ATTORNEYS.

Feb. 8, 1927. 1,616,837
F. E. WILSON
SEPTIC TANK
Original Filed Dec. 3, 1923  2 Sheets-Sheet 2
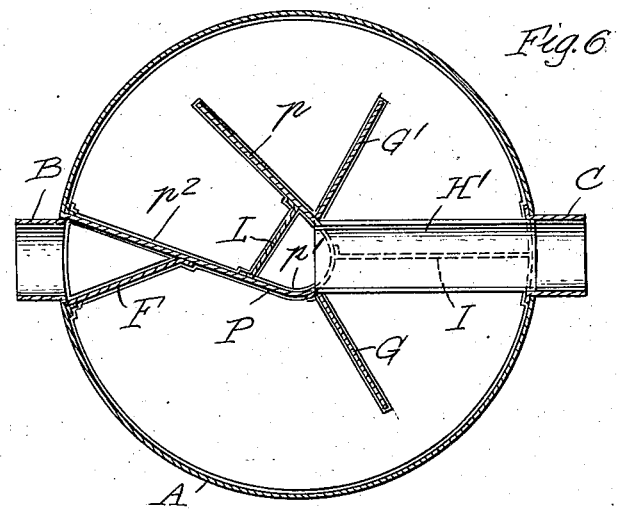
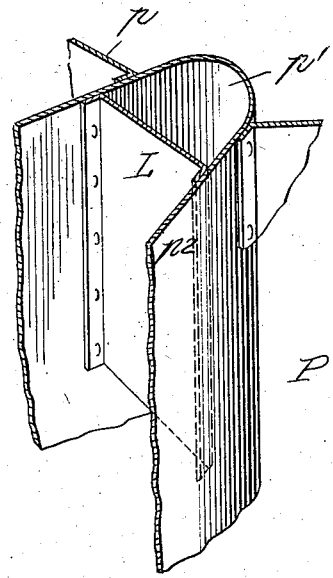
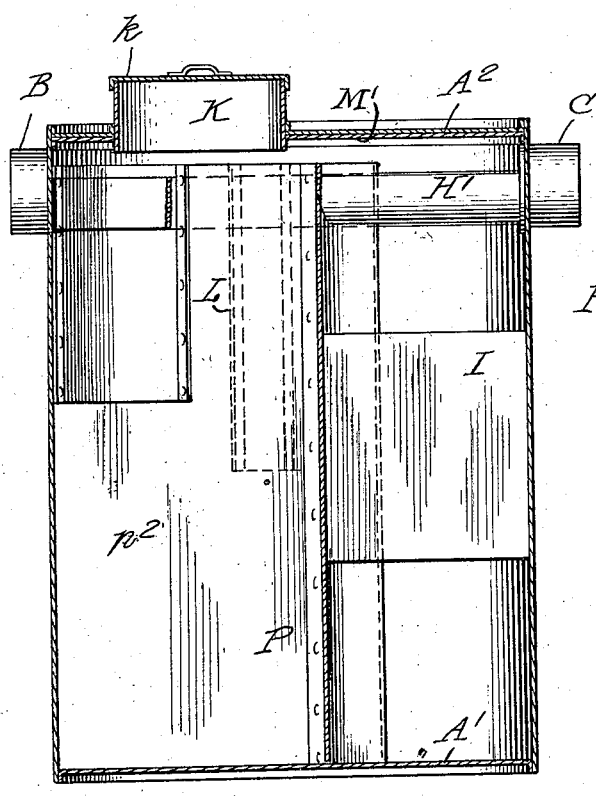

Patented Feb. 8, 1927.

1,616,837

UNITED STATES PATENT OFFICE.

FREDERICK E. WILSON, OF BUFFALO, NEW YORK.

SEPTIC TANK.

Application filed December 3, 1923, Serial No. 678,188. Renewed September 22, 1924.

This invention relates to sewage treating apparatus of the kind commonly known as septic tanks and in which the heavier and lighter parts of the sewage are separated and undergo certain changes due to bacteriological action within the tank.

The objects of this invention are to provide a septic tank which is so constructed that the capacity of the tank may be utilized to best advantage for the settling of the sewage and for the bacteriological action within the tank; also to provide a tank of this kind which is economical to construct and efficient in operation and the interior of which is readily accessible for cleaning out or for inspection; also to provide a septic tank which may be built and assembled in a factory and shipped completely assembled, so that no skilled mechanics are required at the place where the tank is installed; also to provide means for protecting a tank of this kind against the corrosive action of the materials which the tank is designed to contain; also to improve the construction of septic tanks in other respects hereinafter specified:

In the accompanying drawing:

Fig. 1 is a top plan view of a septic tank embodying the invention.

Fig. 2 is a sectional elevation thereof on line 2—2 Fig. 1.

Fig. 3 is a sectional plan view thereof on line 3—3 Fig. 2.

Fig. 4 is a fragmentary sectional plan view thereof on line 4—4 Fig. 2.

Fig. 5 is a sectional elevation thereof on line 5—5 Fig. 4.

Fig. 6 is a sectional plan view of a septic tank of slightly modified construction.

Fig. 7 is a sectional elevation thereof.

Fig. 8 is a fragmentary perspective view, on an enlarged scale, of the central tube or passage of the septic tank.

The septic tank embodying my invention is preferably cylindrical in form and for this purpose is provided with a cylindrical outer wall A, a bottom wall A' and a top wall A². In tanks of this kind as heretofore constructed it was customary to permit the sewage to enter at one side of the tank and to be discharged from the other side thereof. This arrangement of the inlet and outlet relatively to each other causes the sewage to travel across the tank mainly in the shortest path and consequently the parts of the tank at the sides of this path are of very little use. In order to overcome this objection the following construction is preferably employed.

The sewage enters into the tank thru an inlet pipe B which is arranged at one side thereof adjacent to the upper portion of the tank and the material discharged from the tank passes thru a discharge pipe C, which connects with a central upright tubular member or passage D having apertures or openings d at a distance below the upper end of the tubular member D. This central tubular member or passage D is connected with the side wall of the tank by means of a partition wall or plate E, the outer portion of which terminates adjacent to the inlet opening or pipe B. The openings d in the central tube or passage D face substantially toward the inlet pipe B and the partition wall E is interposed between the inlet pipe B and the apertures d in the central tube so that the sewage entering the tank through the inlet pipe must pass around the cylindrical tank from one side of the baffle plate or wall E to the other side thereof and then upwardly thru the central tubular member D and out thru the discharge pipe C.

Owing to the fact that the bacteria which bring about the disintegration of the sewage matter form a scum at the upper portion of the tank, it is desirable that the incoming sewage should be conducted to a part of the tank below the scum so as not to interfere with this scum which is essential to the successful operation of the septic tank. For this purpose a second partition or deflecting wall F is provided which connects the partition wall E with the outer wall A of the tank in such a manner that the partition walls E and F are arranged at opposite sides of the inlet pipe B and form a passage through which the incoming sewage flows to approximately the middle of the tank, since the partition wall F terminates slightly above the middle of the tank. The downward flow of the sewage between the partitions F and E also helps to cause those portions of the sewage which are heavier than water to precipitate at the bottom of the tank. The material after passing thru the space between the partition walls E and F begins to travel around the tank near the outer wall thereof to the opposite side of the baffle wall E. In order to cause the material to take the longest possible path within the tank, a number of radially extending baffles G, G' and G² are preferably provided, three being shown in the construction illustrated, which are secured at their inner ends to the central tubular member D and extend outwardly therefrom, terminating at a distance from the cylindrical wall of the tank. The last of these baffles G² is preferably arranged adjacent to the apertures of the upright tubular member D.

The liquid from the intermediate portion of the tank between the partition wall E and the baffle G² is free to pass into the openings $d$ and to move upwardly in the tubular member D and then pass into a trough H connected with the upper end of the tube D and which terminates in the discharge tube C, the trough shown being open at the upper end thereof. Consequently the liquid withdrawn from the tank is taken from the intermediate portion thereof and none of the scum, formed at the upper end of the tank and containing bacteria which should be kept in the tank, will be removed therefrom neither will any of the bacteria from the lower portion of the tank be drawn upwardly thru the tube C. Furthermore the openings in the tubular member D are so far removed from the inlet pipe of the tank that both the lighter and heavier particles in the sewage have had ample opportunity to either pass to the upper surface or to the bottom of the tank during the flow of the liquid from the inlet pipe to the outlet tube D.

In addition to the baffle walls described, a plate I is preferably employed which extends from the central upright tube to the outer wall of the tank and which is arranged approximately intermediate between the upper and lower walls of the tank.

The septic tank is preferably provided in the upper wall A² thereof with a man-hole or other opening K which may be provided with a suitable cover $k$. This opening in the upper wall of the tank is preferably so located that it extends substantially from the middle or axial part of the tank to a point adjacent to the outer wall thereof and near the inlet pipe of the tank, as is clearly shown in Figs. 1, 2 and 7. By arranging the man-hole in the position indicated, the inlet to the tank, as well as the central upright tube of the tank and the space at opposite sides of the partition and baffle walls E and G², are rendered accessible by means of a single opening.

It is customary to protect tanks of this kind against rust or corrosion by coating the same with a suitable bituminous or asphaltum composition, and this is preferably done by dipping the tank in the hot composition. It has been found, however, that in septic tanks a certain amount of fatty materials collects approximately at the water line and these materials, as well as some of the gases formed in the septic tank, attack the bituminous substances usually employed for coating the tank. In order to overcome this objection a strip of flexible material M, such for example as paper, asbestos or analogous material is secured to the inner surface of the upper parts of the tank and preferably extends a short distance below the water level, this being preferably done while the bituminous or asphaltum coating is still hot and in liquid form so that the coating itself binds or seals the layer of flexible material to the tank. In a similar manner a layer of flexible material M' may be secured to the inner face of the cover portion of the tank. It has been found that grease, fatty materials and gases do not penetrate through a layer of material of this kind, and thus damage to the tank at and above the water line is prevented. If desired, the tank may be again dipped in an enamel or other composition capable of resisting the action of fats and greases as well as of the other liquids contained in the tank, so that any pores or crevices which may be formed in the bituminous or asphaltum coating during the drying or hardening thereof will be covered. Other means for coating the metal of the tank may be employed if desired.

In the construction shown in Figs. 1 to 5 the tubular member D is in the form of a tube extending from the bottom of the tank to a point above the level of the liquid in the tank and in the modified construction shown in Figs. 6 to 8 this central upright tube D and the partition wall E and baffle G² are replaced by a single U-shaped member P which has a comparatively short leg or end $p$, an intermediate half rounded or bent portion $p'$ and a longer leg or part $p^2$ forming a partition wall which extends from the axial portion of the tank to the side wall thereof and corresponds to the partition plate or wall E, the short leg $p$ corresponding to the baffle wall G². In order to form an upward flow passage in the middle portion of the tank, the upper part of the rounded portion $p'$ of the U-shaped member is closed by means of a partition plate L which forms a closed channel or passage with the rounded portion $p'$. The U-shaped member P extends from the bottom of the tank upwardly to a point above the liquid level of the tank and the partition plate L extends downwardly from above the liquid level to about the middle portion of the tank as shown in Fig. 7. In the operation of this tank, the material after passing around the baffle wall $p$ enters into the space between this wall and the partition wall $p^2$ and the material from the middle portion in the tank passes upwardly between the partition L and the bent portion $p'$ of the U-shaped member P and then enters into a trough H' connecting the partition P with the outlet pipe C. Except as specified the septic tank shown in Figs. 6 to 8 is substantially similar to that shown in Figs. 1 to 5.

It will be obvious that in both of the constructions described, the liquid enters the tank at one side thereof and passes downwardly into the intermediate portion of the tank and then takes a circuitous passage around the tank to the discharge outlet. In passing around the tank, the liquid flows partly in a circumferential direction and partly in a radial direction so that efficient use is made of all portions of the tank.

The tank described has the advantage that it can be made of sheet metal and can be assembled at a factory ready to be placed into the ground and the arrangement of the walls within the tank is such that full capacity of the tank is made use of to good advantage. The tank described separates the sewage very effectively and is inexpensive to construct and because of the means provided for the prevention of corrosion of the metal, the tank will last indefinitely.

I claim as my invention:

1. A septic tank having an inlet at one side thereof and a substantially upright central passage having an intake at one side thereof arranged intermediate between the upper and lower portions of the tank facing substantially toward said inlet, an outlet pipe connected with said central passage and of substantially the same cross sectional area as said central passage and a partition wall connecting said central passage and the outer wall of the tank and interposed between said inlet and the intake in said central passage, whereby material passing through said tank must pass around the greater portion of said upright central passage in order to enter the intake opening therein.

2. A septic tank having an inlet at one side thereof and a substantially upright central passage having an intake at one side thereof facing substantially toward said inlet, an outlet pipe connected with said central passage, and a partition wall connecting said central passage and the outer wall of the tank and interposed between said inlet and the intake in said central passage, baffles extending outwardly from said central passage toward the outer wall of said tank and extending from above the liquid level to the bottom of the tank whereby material passing through the tank must pass around a greater portion of said upright central passage and around said baffles to enter the intake of said central passage.

3. A septic tank having a substantially cylindrical outer wall provided at one side thereof with an inlet, a substantially upright passage located at approximately the axis of said tank and having an intake opening facing substantially in the direction of said inlet, an outlet pipe connected with said central passage, a partition wall joining said central upright passage and said cylindrical wall and separating said intake opening from said inlet, and a baffle wall interposed between said central passage and the cylindrical wall of said tank and arranged intermediate of the upper and lower portions of the tank against which the stream of sewage impinges to cause a separation of solid particles from the liquid.

4. A septic tank including a substantially cylindrical outer wall having an inlet at one side thereof, a partition wall extending from one side of said inlet toward the axial portion of said tank, a central upright passage arranged at the inner end of said partition wall and having an intake opening on the side of said partition wall opposite to said inlet, and a baffle wall extending from said passage toward the cylindrical wall of said tank and extending from above the liquid level to the bottom of the tank, whereby the incoming liquid passes around the greater portion of said tubular passage and around said baffle wall to the intake opening in said passage, and means for conveying liquid from the upper portion of said passage out of said tank.

5. A septic tank including a substantially cylindrical outer wall having an inlet at one side thereof, a partition wall extending from one side of said inlet toward the axial portion of said tank, a central upright passage arranged at the inner end of said partition wall and having an intake opening on the side of said partition wall opposite to said inlet, said intake opening being arranged below the liquid level in said tank, a discharge pipe connected with said upright passage at the liquid level in said tank and extending from above the liquid level to the bottom of the tank, and baffle walls extending outwardly from the central portion of said tank which cause the liquid to flow around said tank adjacent to the peripheral wall thereof.

6. A septic tank including a substantially cylindrical outer wall having an inlet at one side thereof, a partition wall extending from one side of said inlet toward the axial portion of said tank, a central upright passage arranged at the inner end of said partition wall and having an intake opening on the side of said partition wall opposite to said inlet, a baffle wall extending from said passage toward the cylindrical wall of said tank and extending from above the liquid level to the bottom of the tank, and a partition extending from said partition wall to the cylindrical wall at the other side of said inlet and extending from above the liquid level to a depth intermediate between the upper and lower ends of the tank to cause sewage entering said tank to pass to the intermediate portion thereof, said intake opening in said central passage being arranged below the liquid level in said tank, to withdraw liquid from the intermediate portion of the tank.

7. A septic tank including a substantially cylindrical outer wall having an inlet at one side thereof, a partition wall extending from one side of said inlet toward the axial portion of said tank, a central upright passage arranged at the inner end of said partition wall and having an intake opening on the side of said partition wall opposite to said inlet, a baffle wall extending from said passage toward the cylindrical wall of said tank, a partition extending from said partition wall to the cylindrical wall at the other side of said inlet and extending from above the liquid level to a depth intermediate between the upper and lower ends of the tank to cause sewage entering said tank to pass to the intermediate portion thereof, said intake opening in said central passage being arranged below the liquid level in said tank to withdraw liquid from the intermediate portion of the tank, and a baffle plate extending from said central passage to said cylindrical wall and arranged in the intermediate part of said tank and against which the stream of sewage in the intermediate portion of said tank impinges to separate the liquid and solid matters in said tank.

8. A septic tank including a substantially cylindrical outer wall and upper and lower end walls, an inlet adjacent to the upper portion of said cylindrical wall, a partition wall extending from said cylindrical wall at one side of said inlet toward the one side of the axis of said tank, an upright passage axially arranged in said tank and with which said partition wall connects, means cooperating with said inlet to form a downflow passage through which the sewage flows after passing into said tank, said upright passage having an intake opening below the liquid level in said tank and facing the side of said partition wall opposite to said inlet, and an opening in the upper wall of said tank arranged in vertical alinement with the axial portion of the tank and extending toward said cylindrical wall near said inlet, whereby said opening affords access to both sides of said partition wall to said downflow passage, to said inlet opening and to said upright passage.

9. A septic tank having a metallic outer wall, metallic partitions within said tank, an outlet in said tank controlling the level of the liquid therein, a coating of bituminous material applied to the faces of the metal of the tank, and a strip of flexible fibrous material secured to said bituminous material while the same is in liquid condition and extending above the water line and a slight distance below the water line in said tank.

10. A septic tank having a metallic outer wall, metallic partitions within said tank, an outlet in said tank controlling the level of the liquid therein, a coating of bituminous material applied to the faces of the metal of the tank, and a strip of flexible fibrous material secured to said bituminous material while the same is in liquid condition and extending a slight distance above and below the water line in said tank and an enamel coating impervious to water and greases covering said bituminous coating and said flexible material.

11. A septic tank having an inlet at one side thereof, a substantially upright central passage having an intake at one side thereof below the liquid level, an outlet pipe adjacent to the upper portion of said central passage for maintaining a constant level of liquid in said tank and said central passage, whereby liquid is withdrawn from the tank from a point below the liquid level therein, and means for causing the material to take a circuitous path around said central passage from said inlet to said intake in said central passage.

12. A septic tank having an inlet for admitting liquid to the tank, a passage extending downwardly from the inlet to the intermediate portion of the tank and having a partition wall disposed approximately radially of the tank, an outlet for the liquid provided with an intake arranged below the liquid level to cause liquid to be withdrawn from the intermediate portion of the tank between the liquid level therein and the bottom thereof, and having a part extending substantially to the liquid level to maintain substantially constant the liquid level in the tank, and a substantially radial partition wall extending from said intake and spaced from the said first mentioned partition wall and cooperating therewith to provide a substantially radial passageway between the partition walls, said partition walls being adapted to cause the liquid to flow both substantially circumferentially and radially in passing from said inlet to said outlet.

13. A septic tank having an inlet port and a discharge port arranged adjacent the liquid level of said tank, and a plurality of baffles in said tank extending upwardly from the bottom of the tank and arranged to permit liquid to flow around an upright edge of each baffle, said baffles having their upper edges above the liquid level of said tank and being arranged to cause the liquid to flow in a circuitous path around the sides of the baffles between said inlet and discharge port.

14. A septic tank having an inlet port and a discharge port arranged adjacent the liquid level of said tank, an inlet passage connected to said inlet port adapted to deliver the liquid from said inlet port into said tank at a point intermediate the liquid level and bottom of said tank, and a plurality of baffles in said tank being arranged to cause the liquid to flow in a circuitous path around the edges of said baffle between said inlet and discharge port.

15. A septic tank having an inlet port and a discharge port arranged adjacent the liquid level of said tank, a discharge passage connected to said discharge port adapted to receive the liquid from the tank between the liquid level and bottom thereof and deliver said liquid to said discharge port, and a plurality of baffles in said tank terminating short of the side walls of said tank and extending from the bottom of said tank to above the liquid level in said tank and adapted to cause said liquid to flow in a circuitous path between said inlet and discharge port.

16. A septic tank having an inlet which is adapted to admit liquid to the tank below the liquid level therein, an outlet for the liquid which has a part extending substantially to the liquid level and having its intake arranged below the liquid level in the tank to cause the liquid to be withdrawn from a part of the tank intermediate between the liquid level therein and the bottom thereof, and a deflecting wall extending upwardly from the bottom of the tank to a part thereof above the liquid level therein to cause the liquid to travel from said inlet to said outlet in a circuitous path around an upright edge of said wall.

17. A septic tank having an inlet for admitting liquid to the tank below the liquid level therein, an outlet for the liquid which has an intake arranged below the liquid level therein, and a part extending approximately to the liquid level to maintain a substantially constant level of liquid therein and to cause liquid to be discharged from a part of the tank intermediate between the liquid level and the bottom of the tank, and a deflecting wall which extends from the bottom of the tank to a part thereof above the liquid level and which is so positioned as to cause the liquid to flow around an upright edge of said wall and substantially circumferentially in said tank while passing from said inlet to said outlet.

18. A septic tank having an inlet for admitting liquid to the tank below the liquid level therein, an outlet for the liquid which has an intake arranged below the liquid level therein, and a part extending approximately to the liquid level to maintain a substantially constant level of liquid therein and to cause liquid to be discharged from a part of the tank intermediate between the liquid level and the bottom of the tank, and a plurality of deflecting walls which extend from the bottom of said tank to a part thereof above the liquid level therein and which causes the liquid to flow around upright edges thereof both substantially circumferentially and substantially radially in said tank in passing from said inlet to said outlet.

19. A septic tank having an inlet port and a discharge port arranged adjacent the liquid level of said tank, a baffle in said tank extending inwardly from the wall of said tank adjacent to one side of one of said ports to cause the liquid to flow in a circuitous path in said tank and extending above the liquid level therein and a second baffle connecting said first mentioned baffle and the wall of said tank at the other side of said port and extending from above the liquid level therein to a distance below said liquid level to form a passage between said port and a part of the tank below the liquid level therein, whereby liquid flowing in said passage will not disturb the upper surface of the liquid in said tank.

20. A septic tank comprising a single casing having inlet and outlet conduits opening into the casing at spaced points, said outlet conduit opening into the casing at a level well below the level of its section which determines the maximum level of the liquid in the casing, the lateral and bottom walls of the casing being otherwise closed, and a baffle wall in the casing between the inlet and outlet openings for causing a circuitous travel of the sewage through the casing between said conduits.

21. A septic tank comprising a single casing having an inlet conduit and an outlet conduit, said conduits both opening into the interior of the casing at a level well below the level of the section of the outlet conduit which determines the maximum level of the liquid in the casing, the lateral and bottom walls of the casing being otherwise closed, and a baffle wall in the casing between the inlet and outlet openings for causing a circuitous travel of sewage through the casing between said conduits.

22. A septic tank comprising a single casing having inlet and outlet conduits opening into the casing at spaced points, said outlet conduit opening into the casing at a level well below the level of its section which determines the maximum level of the liquid in the casing, the lateral and bottom walls of the casing being otherwise closed, and baffle walls in the casing between the inlet and outlet openings for causing a circuitous travel of the sewage through the casing between said conduits, one of said baffle walls extending from the bottom of the casing above the maximum liquid level therein and having an upright edge around which the sewage flows, and one of said walls having its upper and lower edges spaced from the bottom wall and materially below the maximum level whereby the circuitous passage will vary horizontally and vertically.

FREDERICK E. WILSON.